US012188627B1

(12) United States Patent
Su

(10) Patent No.: US 12,188,627 B1
(45) Date of Patent: Jan. 7, 2025

(54) FOLDABLE DECORATIVE LAMP

(71) Applicant: Lin Su, Hunan Province (CN)

(72) Inventor: Lin Su, Hunan Province (CN)

( * ) Notice: Subject to any disclaimer, the term of this patent is extended or adjusted under 35 U.S.C. 154(b) by 0 days.

(21) Appl. No.: 18/644,787

(22) Filed: Apr. 24, 2024

(51) Int. Cl.

| | |
|---|---|
| ***F21S 4/20*** | (2016.01) |
| ***F21S 4/15*** | (2016.01) |
| ***F21S 4/24*** | (2016.01) |
| ***F21V 17/10*** | (2006.01) |
| ***F21V 21/08*** | (2006.01) |
| ***F21V 23/00*** | (2015.01) |
| ***F21V 23/04*** | (2006.01) |
| ***F21W 121/00*** | (2006.01) |

(52) U.S. Cl.
CPC . *F21S 4/20* (2016.01); *F21S 4/15* (2016.01); *F21V 17/108* (2013.01); *F21V 21/08* (2013.01); *F21V 23/001* (2013.01); *F21V 23/003* (2013.01); *F21V 23/007* (2013.01); *F21V 23/04* (2013.01); *F21S 4/24* (2016.01); *F21W 2121/00* (2013.01)

(58) Field of Classification Search
CPC .......... F21S 4/24; F21V 17/108; F21V 21/08; F21V 21/0816; F21V 21/0832; F21V 23/001; F21V 23/003; F21V 23/04; F21W 2121/00
See application file for complete search history.

(56) References Cited

U.S. PATENT DOCUMENTS 6,135,617 A * 10/2000 Lai .......................... F21V 17/007 362/396
8,678,615 B1 * 3/2014 Ko .......................... F21S 4/10 362/403
10,161,601 B1 * 12/2018 Chen .......................... F21S 6/00
2012/0044683 A1 * 2/2012 Tong .......................... F21S 4/15 29/428

* cited by examiner

*Primary Examiner* — Alan B Cariaso

(57) ABSTRACT

A decorative lamp includes: a hanging decorative component for hanging the decorative lamp in the air; a connecting component connected to the hanging decorative component, the connecting component being a flexible component; and a decorative component connected to the connecting component. At least one of the hanging decorative component, the connecting component, and the decorative component is provided with light emitting units for emitting light. By configuring the connecting component as a flexible component, the connecting component, the hanging decorative component and the decorative component can be folded together during transportation, so as to effectively reduce volume, facilitate transportation, and reduce transportation costs. Moreover, when the light emitting units are emitting light, a lighting effect can be achieved.

18 Claims, 13 Drawing Sheets

FOLDABLE DECORATIVE LAMP

TECHNICAL FIELD

The present invention relates to a technical field of decorations, in particular to a decorative lamp.

BACKGROUND ART

With the improvement of living standards, people usually assemble decorations in the environment to create a scene. However, at present, existing decorations with light emitting functions, especially those hanging in the air, are bulky and non-foldable, making the decorations inconvenient for transportation and user storage.

SUMMARY

A main purpose of the present invention is to provide a decorative lamp for solving a problem of inconvenient transportation and storage caused by the large volume of existing light emitting decorative hanging products.

In order to solve the above-mentioned technical problem, a technical solution is provided by the present invention.

A decorative lamp includes: a hanging decorative component for hanging the decorative lamp in the air; a connecting component connected to the hanging decorative component, the connecting component being a flexible component; and a decorative component connected to the connecting component. At least one of the hanging decorative component, the connecting component, and the decorative component is provided with light emitting units for emitting light.

Furthermore, the connecting component is a light string component. The hanging decorative component is foldable.

The light string component includes a plurality of first light strings, and at least one part of the first light strings extends to the hanging decorative component.

Furthermore, the decorative component and the connecting component are arranged detachably.

Furthermore, annular components are provided between the decorative component and the first light strings. The decorative component includes: a middle body, supporting arms connected to the middle body, and tape bodies connected to supporting arms. Two ends of the tape bodies are detachably connected. When the tape bodies are sleeved on the annular components, the two ends of the tape bodies are connected.

Furthermore, the tape bodies are hook and loop fasteners. One surface of the tape bodies is a hook surface and an opposite surface of the tape bodies is a loop surface. When the hook and loop fastener tape bodies are sleeved on the annular components, at least one part of the loop surface is fitted with the hook surface.

Furthermore, the decorative lamp further includes a control box. The control box is internally equipped with a circuit board and batteries. The circuit board is electrically connected to the first light strings, and the batteries are electrically connected to the circuit board.

Furthermore, the annular components are hollow. The annular components include a first front housing and a first bottom housing. The first bottom housing is connected to the first front housing to form an annular accommodating cavity.

The annular components are equipped with a wire inlet hole and a wire outlet hole. Both the wire inlet hole and the wire outlet hole are in communication with the annular accommodating cavity.

The light string component further includes second light strings. At least one part of the first light strings is electrically connected to one of the second light strings at one end away from the hanging decorative component. The circuit board is electrically connected to the second light strings. A connection where the first light strings are connected to the second light strings is positioned in the annular accommodating cavity. The first light strings pass through the wire inlet hole, and the second light strings pass through the wire outlet hole.

A plurality of first position limiting columns are arranged inside the annular accommodating cavity. The first position limiting columns are provided with first position limiting openings. The first light strings or the second light strings are placed inside the first position limiting openings.

Furthermore, a total number of the annular components, a total number of the second light strings, and a total number of the supporting arms are all two. Each of the supporting arms is configured corresponding to one of the annular components, and each of the second light strings is configured corresponding to one of the annular components.

The control box is provided with a wire electrically connected to the circuit board. The wire is provided with an electrical connector at one end away from the control box. The electrical connector includes a first connection terminal and a second connection terminal. The first connection terminal is electrically connected to the wire, and the second connection terminal is used in conjunction with the first connection terminal. The second light strings are electrically connected to the second connection terminal. When the second connection terminal is used in conjunction with the first connection terminal, the second connection terminal is electrically connected to the first connection terminal.

Furthermore, the control box includes a second bottom housing and a second front housing. The second front housing is connected to the second bottom housing to form a first accommodating cavity. One side of the second front housing is rotatably connected to the second bottom housing, and an opposite side of the second front housing is detachably connected to the second bottom housing.

The second bottom housing is provided with a baffle board, and the first accommodating cavity is separated by the baffle board to form a first installation cavity and a second installation cavity. The circuit board is arranged in the first installation cavity, and the batteries are arranged in the second installation cavity.

The first installation cavity is equipped with a cover board above the circuit board. The circuit board is equipped with a function button. The cover board is equipped with an avoidance hole at a position corresponding to the function button. The second front housing is equipped with a first via hole at a position corresponding to the function button. The first via hole is equipped with a soft rubber element.

Furthermore, the soft rubber element includes a soft rubber layer and a soft rubber enclosure wall extending downwards from the soft rubber layer. A pressing element of the function button is placed inside the soft rubber enclosure wall. A bottom of the soft rubber enclosure wall abuts against the cover board. A clamping slot is provided on an outer side wall of the soft rubber layer, and a side wall of the first via hole is placed inside the clamping slot.

Furthermore, the decorative component is provided with a placement slot for placing the control box.

The decorative component is detachably equipped with a backpack, and the placement slot is defined in the backpack.

Furthermore, the backpack is equipped with two shoulder straps. The two shoulder straps are arranged on the supporting arms.

Furthermore, the hanging decorative component is in a flat shape.

The hanging decorative component includes a hollow semicircular arc rod, a wave-shaped rod, an arc-shaped rod, and a plurality of connecting rods.

Two ends of the wave-shaped rod are respectively connected to and in communication with two ends of the semicircular arc rod. Both ends of the arc-shaped rod are connected to and in communication with the semicircular arc rod. The plurality of connecting rods are arranged at intervals. Two ends of the connecting rods are respectively connected to and in communication with the arc-shaped rod and the wave-shaped rod.

One of the first light strings is partially placed inside the semicircular arc rod and distributed along a lengthwise direction of the semicircular arc rod. One of the first light strings is partially placed inside the wave-shaped rod and distributed along a lengthwise direction of the wave-shaped rod. One of the first light strings penetrates through a bottom of one of the connecting rods, passes through the arc-shaped rod, and then exits from a bottom of another connecting rod.

One end of the plurality of first light strings positioned on a left side of a central axis of the hanging decorative component is electrically connected to one of the second light strings, and one end of the plurality of first light strings positioned on a right side of the central axis of the hanging decorative component is electrically connected to one of the second light strings.

Furthermore, a total number of the connecting rods is four, and two of the first light strings are partially placed inside the middle two connecting rods respectively.

Furthermore, the hanging decorative component includes a first housing body and a second housing body. The second housing body is detachably connected to the first housing.

The hanging decorative component further includes connecting housing bodies. Two ends of the connecting housing bodies are detachably connected to the first housing body and the second housing body respectively. A hook is provided on one of the connecting housing bodies.

Furthermore, the first housing body is provided with a first fixing block on one side close to the connecting housing bodies, and the second housing body is provided with a second fixing block on one side close to the connecting housing bodies. The connecting housing bodies are provided with a first fixing position and a second fixing position at positions respectively corresponding to the first fixing block and the second fixing block. The first fixing block is placed in the first fixing position when the connecting housing bodies are connected to the first housing body, and the second fixing block is placed in the second fixing position when the connecting housing bodies are connected to the second housing body.

The first housing body, the connecting housing bodies, and the second housing body all include a third front housing and a third bottom housing. The third bottom housing is connected to the third front housing to form a second accommodating cavity. The third bottom housing or the third front housing is provided with second position limiting columns on one side near the second accommodating cavity. The second position limiting columns are provided with second position limiting openings for limiting positions of the first light strings.

A total number of the connecting housing bodies is three, and the connecting housing bodies are respectively positioned in a middle of the semicircular arc rod, the wave-shaped rod, and the arc-shaped rod.

Furthermore, a counterbore is provided on the third front housing, and a stud is provided on the third bottom housing. The third front housing is locked onto the stud after a screw passes through the counterbore.

Furthermore, the hanging decorative component includes a flexible surface, a plurality of supporting rods arranged on the flexible surface, and a fixed component detachably connected to the flexible surface. When the fixed component is connected to the flexible surface, the supporting rods are fixed, so that the flexible surface is unfold. When the fixed component is not assembled with the flexible surface, the plurality of supporting rods draw closer to each other in pace with the folding of the flexible surface.

One of the first light strings is partially distributed along a periphery of the flexible surface, and each of the remaining first light strings is partially distributed along one of the supporting rods.

Furthermore, the fixed component includes a base and a front board detachably connected to the base. A hook is provided on the front board. A second via hole is provided on the flexible surface. The base is provided with a plurality of position limiting slots for limiting positions of the supporting rods.

When the fixed component is assembled to the flexible surface, the plurality of supporting rods are each placed in one of the position limiting slots, the base is positioned on an inner side of the flexible surface, and the front board is positioned on an outer side of the flexible surface.

Furthermore, a screw hole is defined in the front board, and a screw rod is provided on the base. When the front board is assembled with the base, the screw rod passes through the second via hole and then is tightened into the screw hole.

Compared to existing technology, in the present invention, by configuring the connecting component as the flexible component, the connecting component, the hanging decorative component and the decorative component can be folded together during transportation, so as to effectively reduce volume, facilitate transportation and reduce transportation costs. Moreover, when the light emitting units are emitting light, a lighting effect can be achieved.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
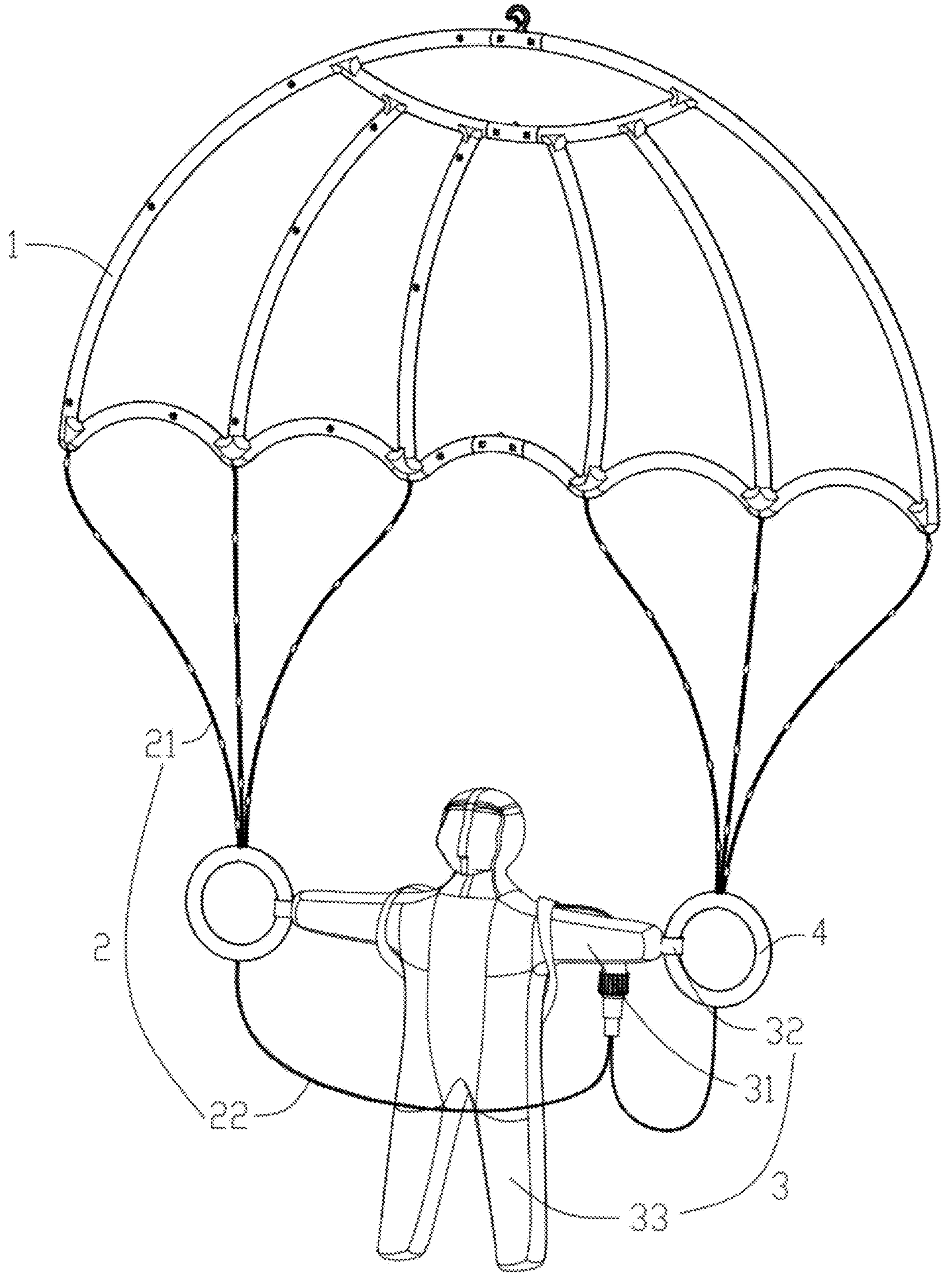
FIG. 1 is a perspective view of one embodiment according to the present invention.
Figure 2:
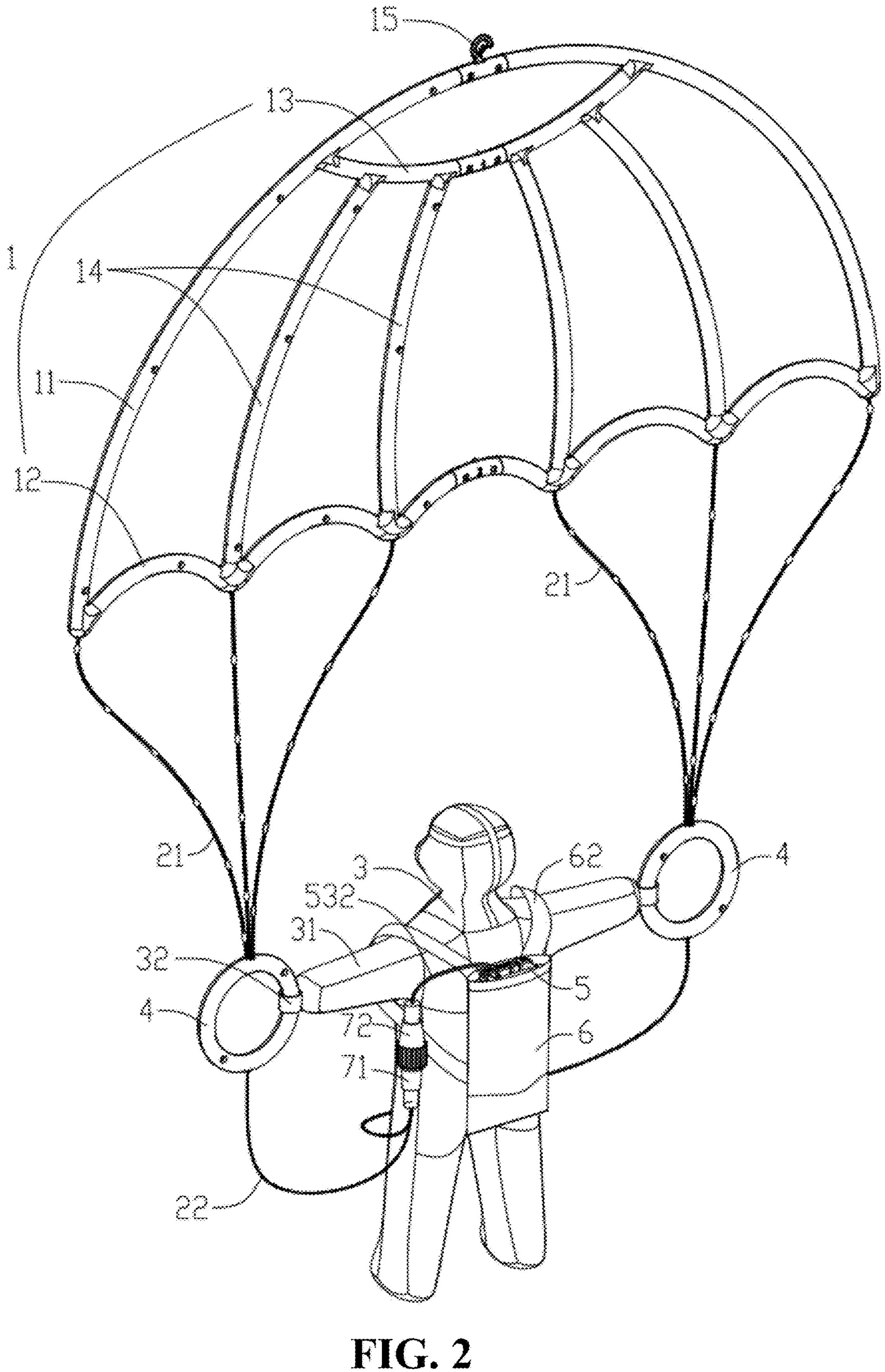
FIG. 2 is a perspective view of one embodiment from another perspective according to the present invention.
Figure 3:
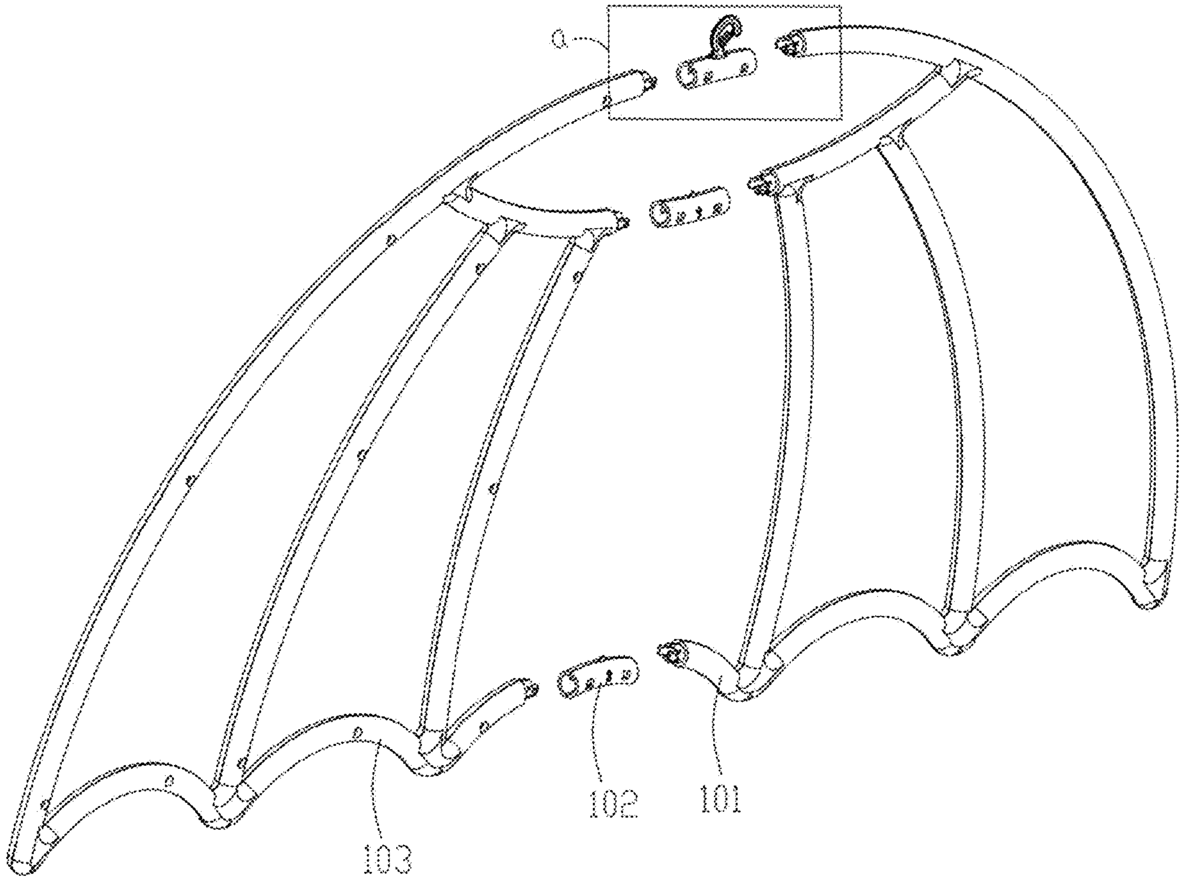
FIG. 3 is a partial exploded view of a hanging decorative component in one embodiment according to the present invention.
Figure 4:
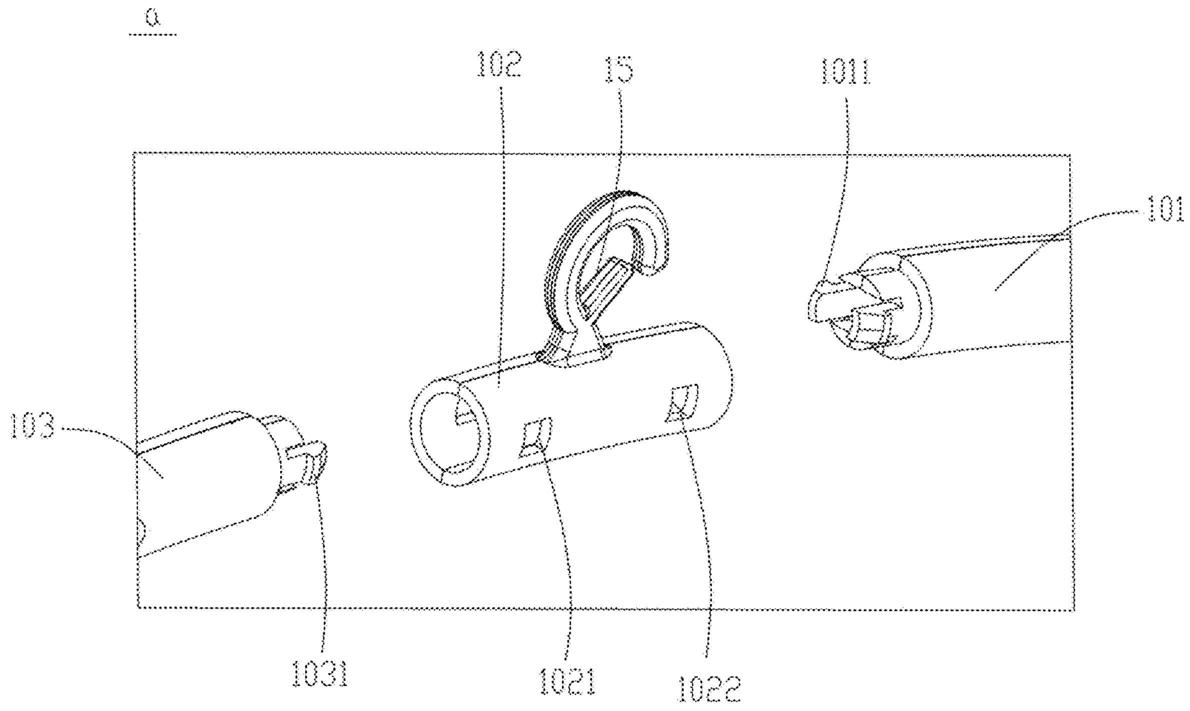
FIG. 4 is an enlarged view of area a in FIG. 3.
Figure 5:
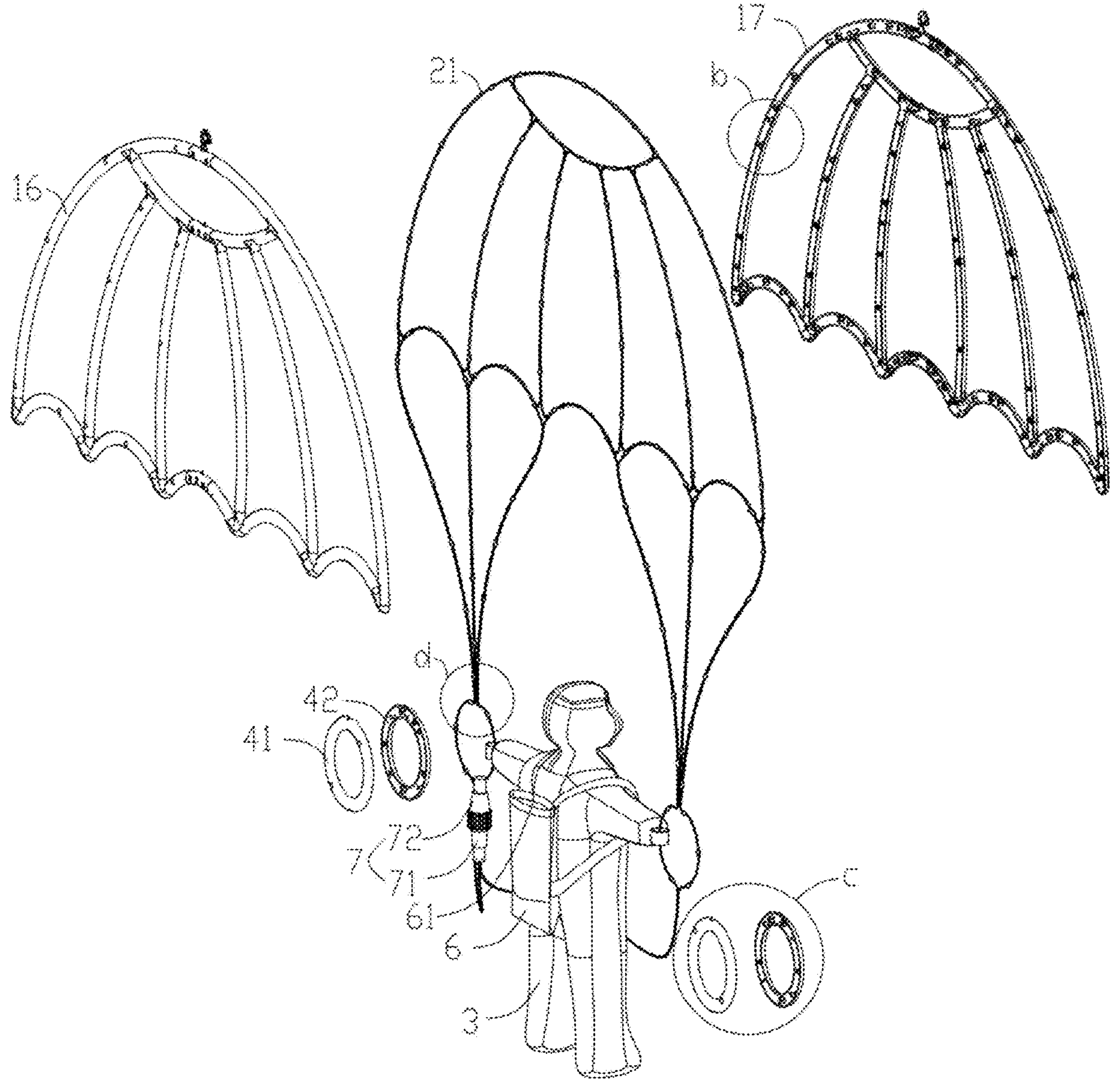
FIG. 5 is a partial exploded view of one embodiment according to the present invention.
Figure 6:
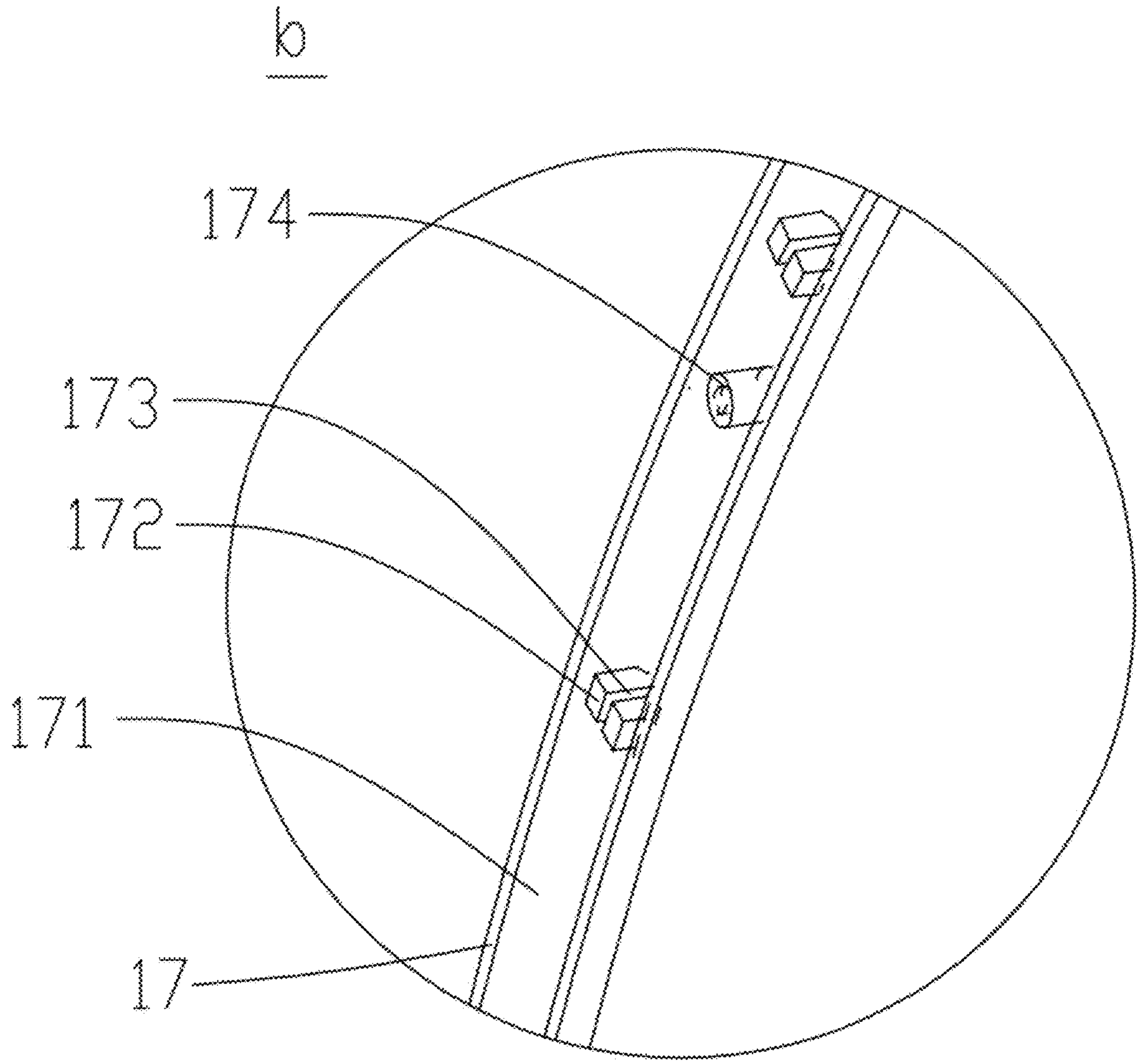
FIG. 6 is an enlarged view of area b in FIG. 5.
Figure 7:
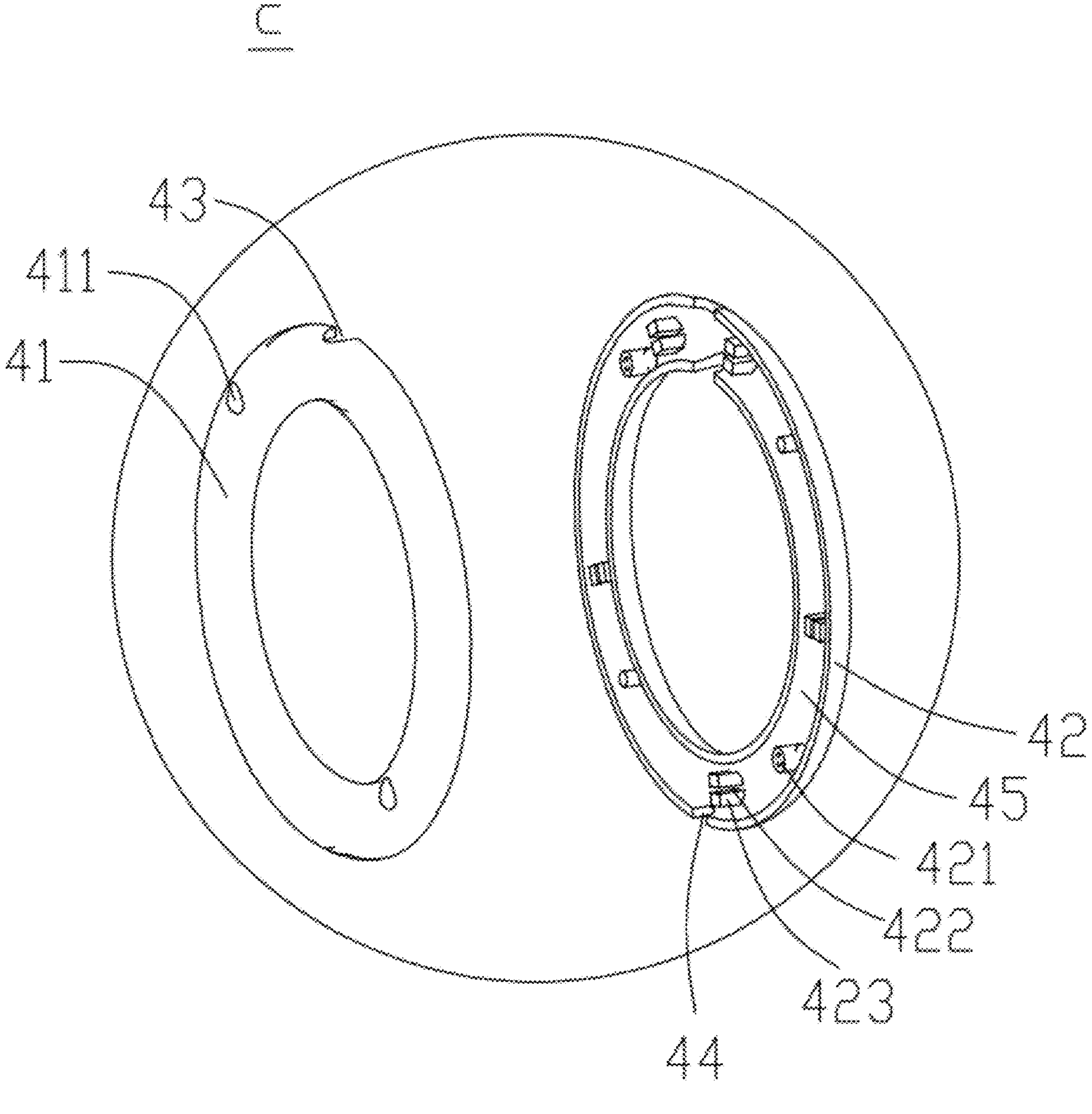
FIG. 7 is an enlarged view of area c in FIG. 5.
Figure 8:
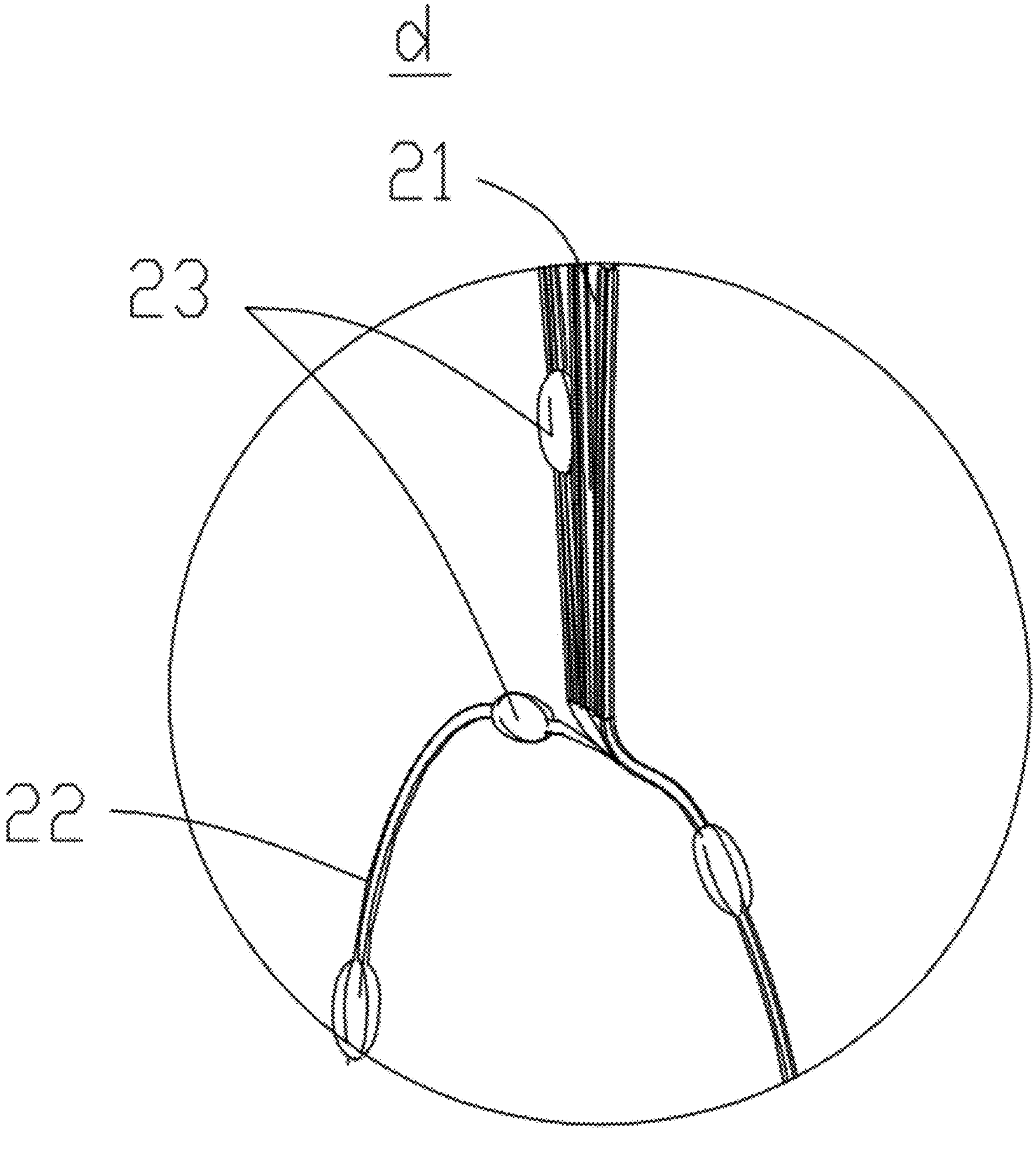
FIG. 8 is an enlarged view of area d in FIG. 5.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

FIGS. 1-13 show a decorative lamp according to embodiments of the present invention.

Referring to FIGS. 1-8 and FIGS. 12-13, the decorative lamp includes: a hanging decorative component 1 for hanging the decorative lamp in the air; a connecting component 2 connected to the hanging decorative component 1, the connecting component 2 being a flexible component;

and a decorative component 3 connected to the connecting component 2. At least one of the hanging decorative component 1, the connecting component 2, and the decorative component 3 is provided with light emitting units 23 for emitting light.

In this embodiment, by configuring the connecting component 2 as a flexible component, the connecting component 2, the hanging decorative component 1 and the decorative component 3 can be folded together during transportation, so as to effectively reduce volume, facilitate transportation and reduce transportation costs. Moreover, when the light emitting units 23 are emitting light, a lighting effect can be achieved.

In one embodiment, the hanging decorative component 1 is foldable, so that the hanging decorative component 1 is folded to further reduce the volume during product transportation.

In one embodiment, the connecting component 2 is a light string component. The light string component includes a plurality of first light strings 21, and at least one part of the first light strings 21 extends to the hanging decorative component 1, so that the hanging decorative component 1 can also have a lighting effect. Specifically, the hanging decorative component 1 is a decorative item and can create a scene in conjunction with the lighting effect. For example, when the hanging decorative component 1 is in a shape of a cloud, in conjunction with the lighting effect, a weather scene can be created. When the hanging decorative component 1 is in a shape of an animal, in conjunction with the lighting effect, a relaxed and cute scene can be created. A shape of the hanging decorative component 1 is not limited here.

In one embodiment, the decorative component 3 and the connecting component 2 are arranged detachably, thereby further facilitating product transportation and facilitating the production and manufacturing of the decorative lamp.

In one embodiment, annular components 4 are provided between the decorative component 3 and the first light strings 21. The decorative component 3 includes: a middle body 33, supporting arms 31 connected to the middle body 33, and tape bodies 32 connected to supporting arms 31. Two ends of the tape bodies 32 are detachably connected. When the tape bodies 32 are sleeved on the annular components 4, the two ends of the tape bodies 32 are connected. When the two ends of the tape bodies 32 are separated, the decorative component 3 can be removed from the circular components 4 to achieve the disassembly of the decorative component 3 and the connecting component 2. Specifically, a projection of the annular components 4 can be circular (i.e. circular ring), square, triangle, pentagon, other polygons or irregularly shaped, etc. A shape of the annular components 4 is not limited here.

In one embodiment, the tape bodies 32 can be hook and loop fasteners, that is, one surface of the tape bodies 32 is a hook surface and an opposite surface of the tape bodies 32 is a loop surface. When the hook and loop fastener tape bodies 32 are sleeved on the annular components 4, at least one part of the loop surface is fitted with the hook surface to achieve a detachable connection between the decorative component 3 and the connecting component 2. Of course, in other embodiments, two ends of the tape bodies 32 can also be detachably connected by means of buttons, buckles, pins, etc.

In one embodiment, the decorative lamp further includes a control box 5. The control box 5 is internally equipped with a circuit board 53 and batteries 52. The circuit board 53 is electrically connected to the first light strings 21, and the batteries 52 are electrically connected to the circuit board 53. The batteries 52 are used for supplying power to the circuit board 53, and the first light strings 21 can be controlled to work through the circuit board 53, so that the decorative lamp can work independently without the hassle of connecting to an external power source.

In one embodiment, the annular components 4 are hollow. The annular components 4 include a first front housing 41 and a first bottom housing 42. The first bottom housing 42 is connected to the first front housing 41 to form an annular accommodating cavity 45. The annular components 4 are equipped with a wire inlet hole 43 and a wire outlet hole 44. Both the wire inlet hole 43 and the wire outlet hole 44 are in communication with the annular accommodating cavity 45. The light string component further includes second light strings 22. At least one part of the first light strings 21 is electrically connected to one of the second light strings 22 at one end away from the hanging decorative component 1. The circuit board 53 is electrically connected to the second light strings 22. A connection where the first light strings 21 are connected to the second light strings 22 is positioned in the annular accommodating cavity 45. The first light strings 21 pass through the wire inlet hole 43, and the second light strings 22 pass through the wire outlet hole 44. The annular components 4 are used for covering the connection where the plurality of first light strings 21 are connected to the second light strings 22, thereby improving the aesthetics of the decorative lamp in this embodiment and facilitating an electrical connection of the light string component and the circuit board 53.

A plurality of first position limiting columns 423 are arranged inside the annular accommodating cavity 45. The first position limiting columns 423 are provided with first position limiting openings 422. The first light strings 21 or the second light strings 22 are placed inside the first position limiting openings 422. The first position limiting openings 422 are used for limiting a position of the light string component, thereby facilitating a connection between the first front housing 41 and the first bottom housing 42.

Specifically, in one embodiment, the first front housing 41 and the first bottom housing 42 can be fixed by means of buckles, screws, etc. The connection where the first light strings 21 are connected to the second light strings 22 can be waterproofed by means of gluing or wrapping waterproof tape, etc.

In one embodiment, a total number of the annular components 4, a total number of the second light strings 22, and a total number of the supporting arms 31 are all two. Each of the supporting arms 31 is configured corresponding to one of the annular components 4, and each of the second light strings 22 is configured corresponding to one of the annular components 4. That is, when the decorative component 3 is a humanoid doll, the two supporting arms 31 are the arms. The two arms of the humanoid doll pull the annular components 4, in conjunction with the plurality of first light strings 21, a scene of the humanoid doll wearing a parachute and landing can be formed. The humanoid doll can be Santa Claus, aviation personnel, etc. Of course, the decorative component 3 can also be in a form of animals. A specific shape of the decorative component 3 is not limited here.

In one embodiment, the control box 5 is provided with a wire 532 electrically connected to the circuit board 53. The wire 532 is provided with an electrical connector 7 at one end away from the control box 5. The electrical connector 7 includes a first connection terminal 72 and a second connection terminal 71. The first connection terminal 72 is electrically connected to the wire 532, and the second connection terminal 71 is used in conjunction with the first connection terminal 72. The second light strings 22 are electrically connected to the second connection terminal 71. When the second connection terminal 71 is used in conjunction with the first connection terminal 72, the second connection terminal 71 is electrically connected to the first connection terminal 72.

In one embodiment, the control box 5 includes a second bottom housing 512 and a second front housing 511. The second front housing 511 is connected to the second bottom housing 512 to form a first accommodating cavity 510. One side of the second front housing 511 is rotatably connected to the second bottom housing 512, and an opposite side of the second front housing 511 is detachably connected to the second bottom housing 512 for the assembly of the circuit board 53 and the batteries 52. The second bottom housing 512 is provided with a baffle board 519, and the first accommodating cavity 510 is separated by the baffle board 519 to form a first installation cavity 517 and a second installation cavity 518. The circuit board 53 is arranged in the first installation cavity 517, and the batteries 52 are arranged in the second installation cavity 518. The baffle board 519 is used for separating the batteries 52 from the circuit board 53.

In one embodiment, the control box 5 is semitransparent, and the first installation cavity 517 is equipped with a cover board 54 above the circuit board 53. The cover board 54 can cover the circuit board 53, improving the aesthetics of the control box 5. Moreover, the cover board 54 can limit a position of the circuit board 53, improving the compactness of a structure of the control box 5.

In one embodiment, the circuit board 53 is equipped with a function button 531. By operating the function button 531, the first light strings 21 and the second light strings 22 can be turned on and off, and a lighting mode of the first light strings 21 and the second light strings 22 can be switched.

The cover board 54 is equipped with an avoidance hole 541 at a position corresponding to the function button 531, and the second front housing 511 is equipped with a first via hole 5111 at a position corresponding to the function button 531. The first via hole 5111 is equipped with a soft rubber element 513. The soft rubber element 513 can undergo deformation under external force, so that when users press the soft rubber element 513, the function button 531 can be pressed, and a waterproof effect can be achieved through the soft rubber element 513. A waterproof rubber ring 514 is arranged between the second bottom housing 512 and the second front housing 511 to achieve a waterproof function of the control box 5. A wiring hole 515 is provided on a side wall of the second bottom housing 512 at a position corresponding to the circuit board 53. The wire 532 passes through the wiring hole 515, and the control box 5 is sealed by using glue or configuring a rubber ring between the wire 532 and the second bottom housing 512.

In one embodiment, the soft rubber element 513 includes a soft rubber layer 5131 and a soft rubber enclosure wall 5133 extending downwards from the soft rubber layer 5131. A pressing element of the function button 531 is placed inside the soft rubber enclosure wall 5133. A bottom of the soft rubber enclosure wall 5133 abuts against the cover board 54 to tightly press the cover board 54. A clamping slot 5132 is provided on an outer side wall of the soft rubber layer 5131, and a side wall of the first via hole 5111 is placed inside the clamping slot 5132, so that the soft rubber element 513 is fixed at the avoidance hole 541 of the second front housing 511.

In one embodiment, the decorative component 3 is provided with a placement slot 61 for placing the control box 5. Therefore, when the decorative lamp in this embodiment is hung in the air, the control box 5 can be placed in the placement slot 61 to prevent a weight of the control box 5 from pulling the first light strings 21 and the second light strings 22, and to prevent an unsightly appearance caused by the control box 5 hanging in the air, thereby improving a visual effect.

In one embodiment, the decorative component 3 is detachably equipped with a backpack 6, and the placement slot 61 is defined in the backpack 6. The backpack 6 is detachable, providing users with a sense of assembly and increasing an entertainment value of the decorative lamp.

In one embodiment, the backpack 6 is equipped with two shoulder straps 62. The two shoulder straps 62 are arranged on the supporting arms 31, so that when the decorative component 3 is connected to the connecting component 2, the backpack 6 is assembled onto the decorative component 3.

In one embodiment, the control box 5 is further provided with a hanging hole 516, and the control box 5 can be matched with an external hook 15 through the hanging hole 516, so that the control box 5 can be suspended and fixed to prevent the control box 5 from pulling the first light strings 21 and the second light strings 22.

In one embodiment, the hanging decorative component 1 is in a flat shape.

For example, the hanging decorative component 1 includes a hollow semicircular arc rod 11, a wave-shaped rod 12, an arc-shaped rod 13, and a plurality of connecting rods 14. Two ends of the wave-shaped rod 12 are respectively connected to and in communication with two ends of the semicircular arc rod 11. Both ends of the arc-shaped rod 13 are connected to and in communication with the semicircular arc rod 11. The plurality of connecting rods 14 are arranged at intervals. Two ends of the connecting rods 14 are respectively connected to and in communication with the arc-shaped rod 13 and the wave-shaped rod 12. That is, an interior of the hanging decorative component 1 is in communication, so as to facilitate a distribution of the first light strings 21.

Specifically, in order to reduce a total number of the first light strings 21, one of the first light strings 21 is partially placed inside the semicircular arc rod 11 and distributed along a lengthwise direction of the semicircular arc rod 11. One of the first light strings 21 is partially placed inside the wave-shaped rod 12 and distributed along a lengthwise direction of the wave-shaped rod 12. One of the first light strings 21 penetrates through a bottom of one of the connecting rods 14, passes through the arc-shaped rod 13, and then exits from a bottom of another connecting rod 14.

In order to form a structure of a parachute and facilitate an electrical connection between the light string component and the circuit board 53, one end of the plurality of first light strings 21 positioned on a left side of a central axis of the hanging decorative component 1 is electrically connected to one of the second light strings 22, and one end of the plurality of first light strings 21 positioned on a right side of the central axis of the hanging decorative component 1 is electrically connected to one of the second light strings 22.

In one embodiment, a total number of the connecting rods 14 is four, and two of the first light strings 21 are partially placed inside the middle two connecting rods 14 respectively. In other embodiments, the total number of the connecting rods 14 can also be two, one, three, five, etc., and the total number of the connecting rods 14 is not limited here.

In one embodiment, the hanging decorative component 1 includes a first housing body 103 and a second housing body 101. The second housing body 101 is detachably connected to the first housing body 103. It should be understood that the semicircular arc rod 11, the wave-shaped rod 12, the arc-shaped rod 13, and the plurality of connecting rods 14 together can form the first housing body 103, the second housing body 101, and connecting housing bodies 102.

The hanging decorative component 1 further includes the connecting housing bodies 102. Two ends of the connecting housing bodies 102 are detachably connected to the first housing body 103 and the second housing body 101 respectively, so that when the connecting housing bodies 102, the first housing body 103, and the second housing body 101 are separated, the connecting housing bodies 102, the first housing body 103, and the second housing body 101 can be folded. A hook 15 is provided on one of the connecting housing bodies 102, and the decorative lamp in this embodiment can be suspended in the air through the hook 15.

In one embodiment, the first housing body 103 is provided with a first fixing block 1031 on one side close to the connecting housing bodies 102, and the second housing body 101 is provided with a second fixing block 1011 on one side close to the connecting housing bodies 102. The connecting housing bodies 102 are provided with a first fixing position 1021 and a second fixing position 1022 at positions respectively corresponding to the first fixing block 1031 and the second fixing block 1011. The first fixing block 1031 is placed in the first fixing position 1021 when the connecting housing bodies 102 are connected to the first housing body 103, and the second fixing block 1011 is placed in the second fixing position 1022 when the connecting housing bodies 102 are connected to the second housing body 101, so that the connecting housing bodies 102 can be detachably connected to the first housing body 103 and the second housing body 101.

In order to facilitate the production and manufacturing of the hanging decorative component 1 and the assembly of the first light strings 21, the first housing body 103, the connecting housing bodies 102, and the second housing body 101 all include a third front housing 16 and a third bottom housing 17. The third bottom housing 17 is connected to the third front housing 16 to form a second accommodating cavity 171.

In one embodiment, the third bottom housing 17 or the third front housing 16 is provided with second position limiting columns 172 on one side near the second accommodating cavity 171. The second position limiting columns 172 are provided with second position limiting openings 173 for limiting positions of the first light strings 21. By using the second position limiting openings 173 to limit the positions of the first light strings 21, the third bottom housing 17 is connected to the third front housing 16.

Specifically, in the above embodiments, a total number of the connecting housing bodies 102 is three, and the connecting housing bodies 102 are respectively positioned in a middle of the semicircular arc rod 11, the wave-shaped rod 12, and the arc-shaped rod 13. Of course, in other embodiments, the total number of the connecting housing bodies 102 can also be one, two, four, etc. Manufacturers can configure according to a shape of the hanging decorative component 1, and the total number of the connecting housing bodies 102 is not limited here.

In one embodiment, a counterbore is provided on the third front housing 16, and a stud is provided on the third bottom housing 17. The third front housing 16 is locked onto the stud after a screw passes through the counterbore, thereby achieving connection between the third front housing 16 and the third bottom housing 17. Of course, in other embodiments, the third front housing 16 can also be fixed to the third bottom housing 17 through buckles, gluing, and other means.

Figure 9:
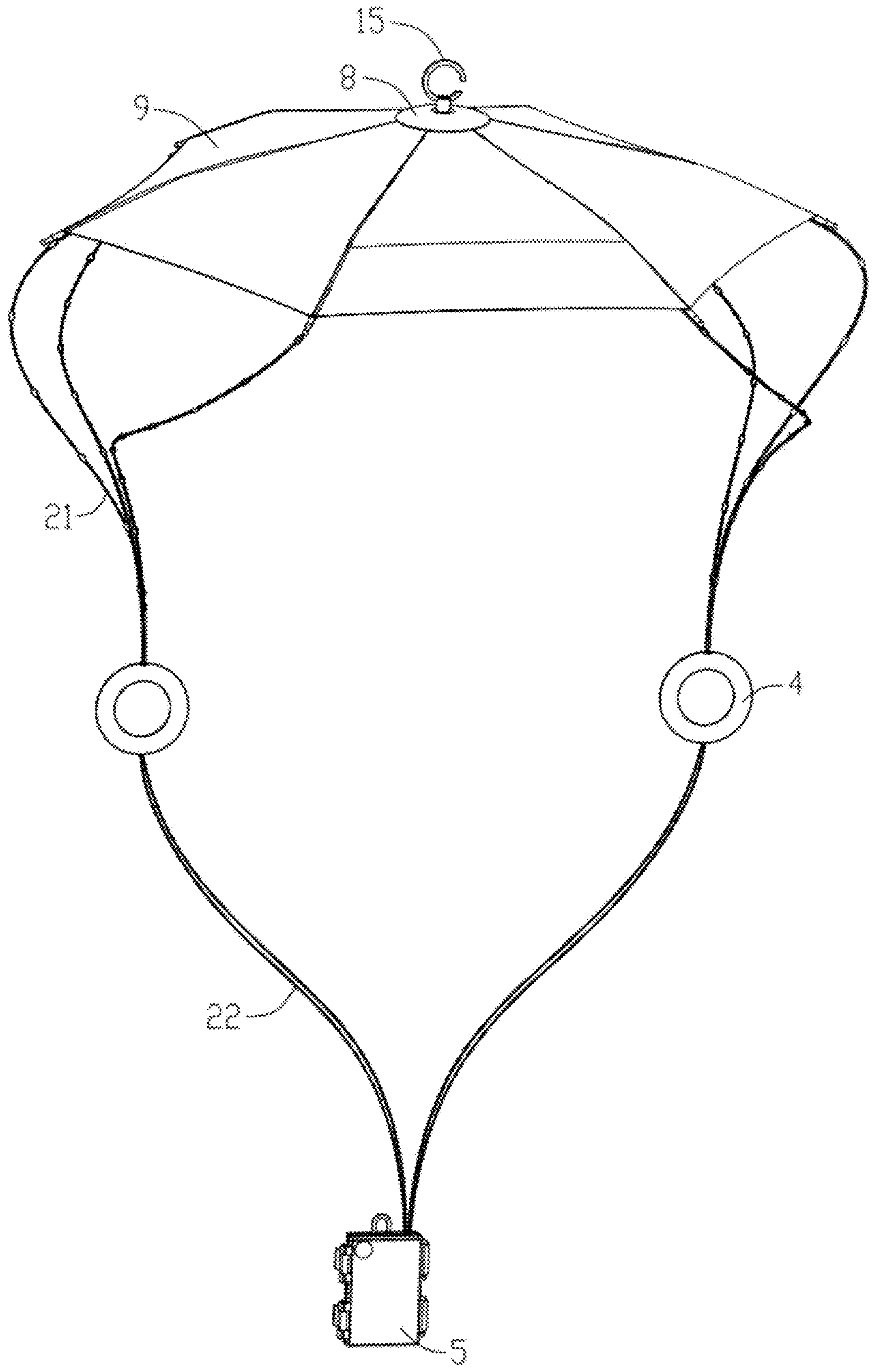
FIG. 9 is a perspective view of another embodiment according to the present invention.
Figure 10:
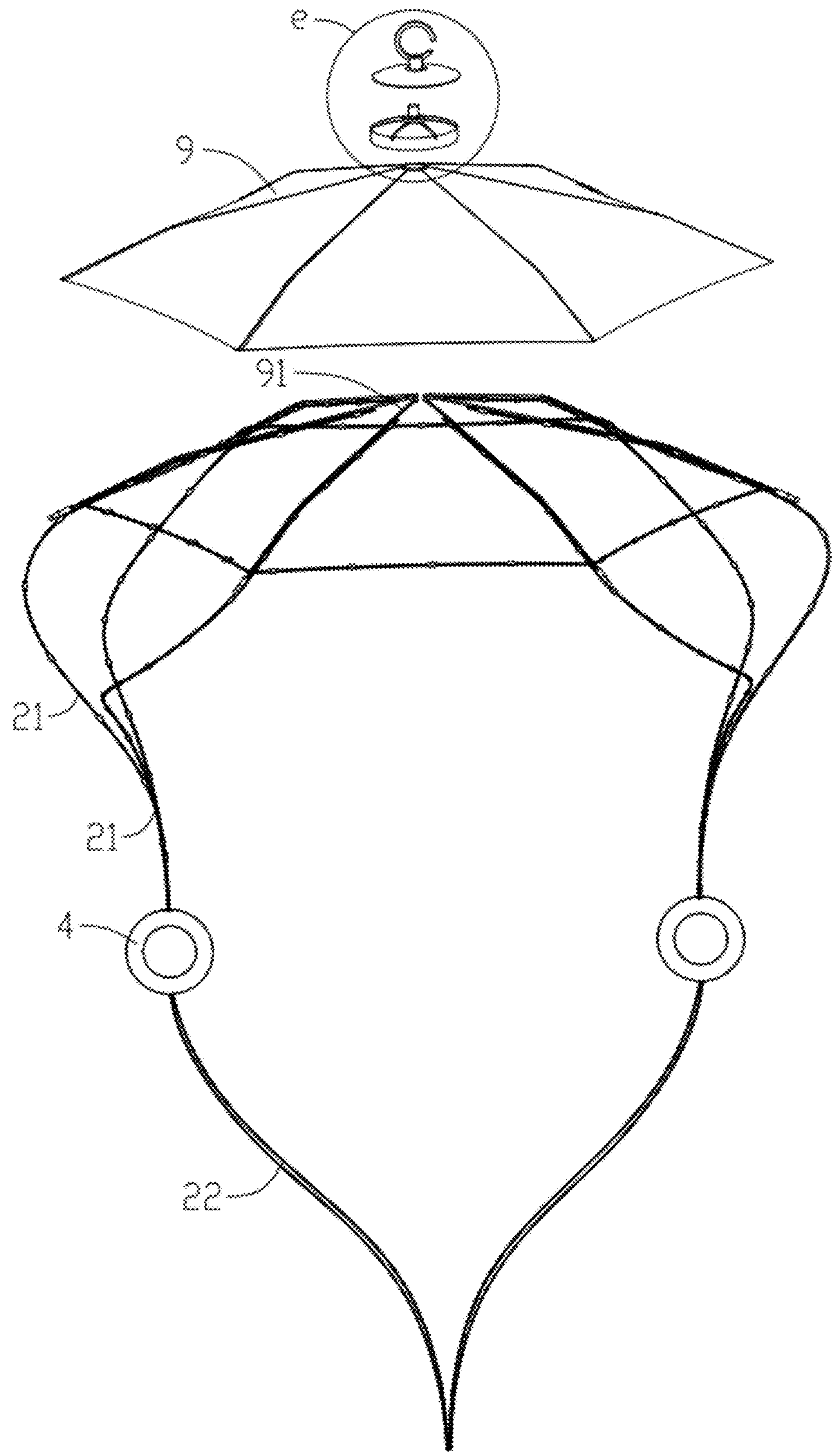
FIG. 10 is a partial exploded view of another embodiment according to the present invention.
Figure 11:
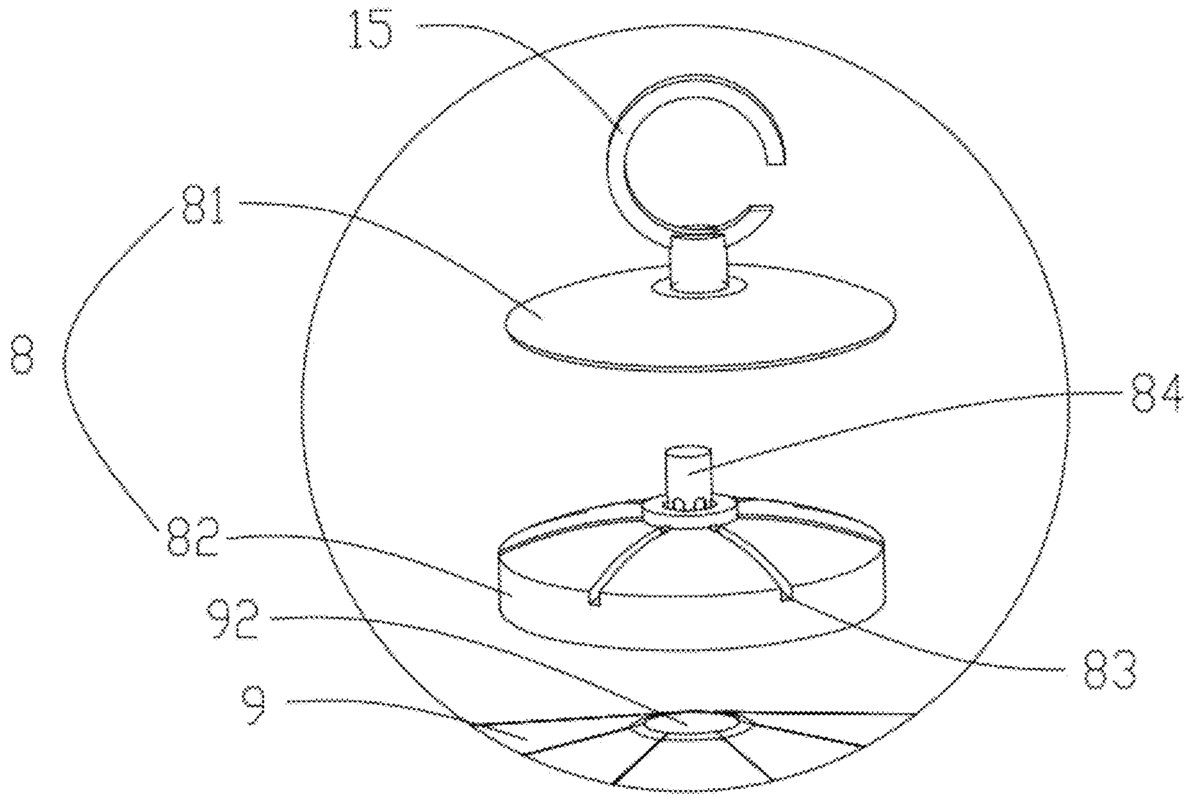
FIG. 11 is an enlarged view of area e in FIG. 10.
Figure 12:
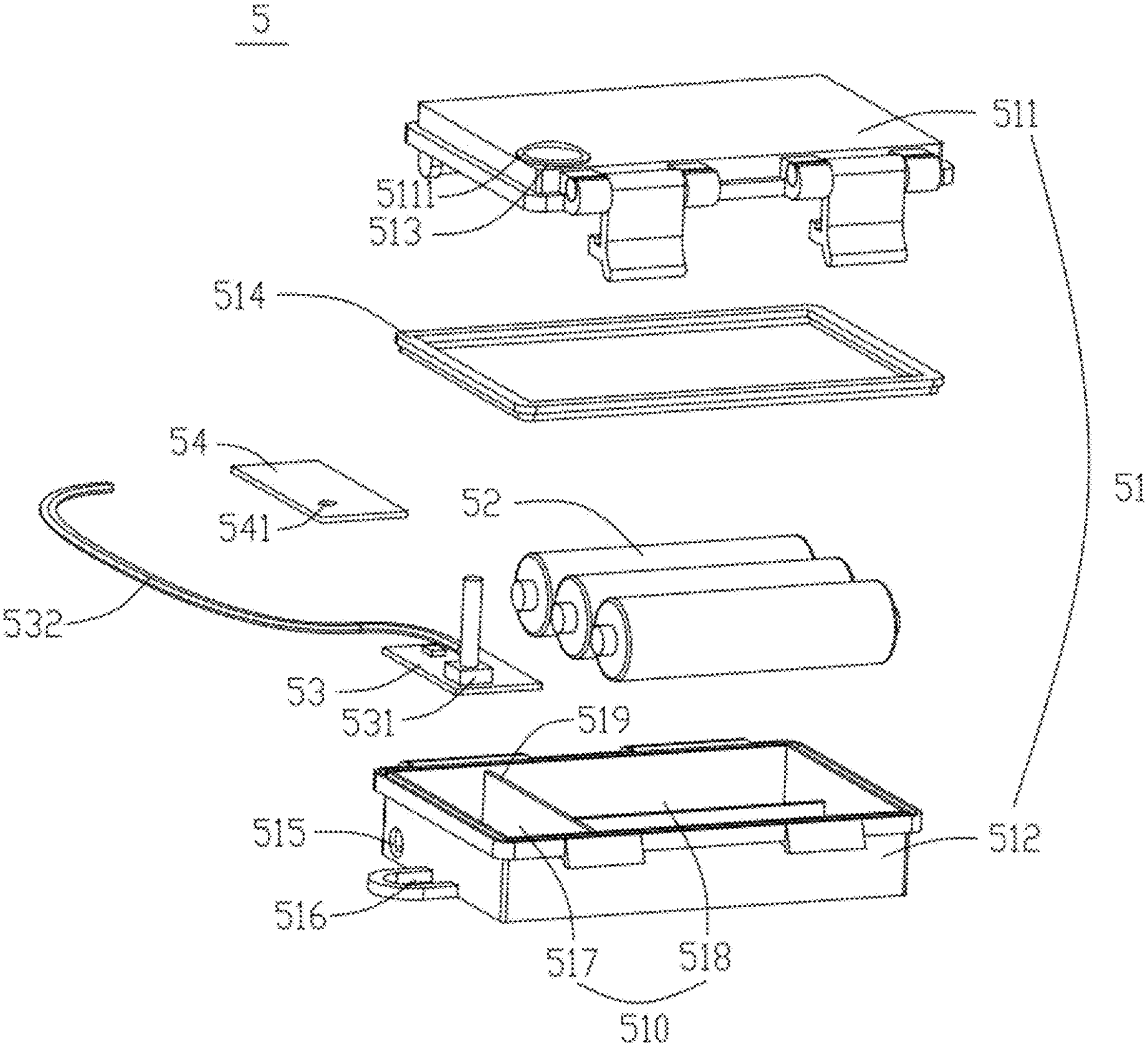
FIG. 12 is an exploded view of a control box in one embodiment according to the present invention.
Figure 13:
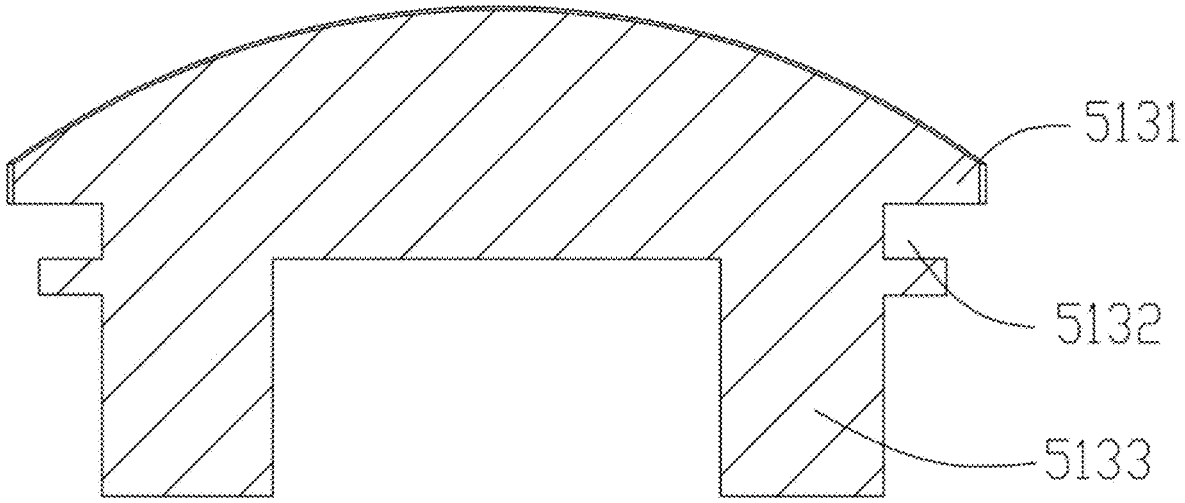
FIG. 13 is a structural diagram of a soft rubber element in one embodiment according to the present invention.

Referring to FIGS. 9-11, in one embodiment, the hanging decorative component 1 includes a flexible surface 9, a plurality of supporting rods 91 arranged on the flexible surface 9, and a fixed component 8 detachably connected to the flexible surface 9. When the fixed component 8 is connected to the flexible surface 9, the supporting rods 91 are fixed, so that the flexible surface 9 is unfold. When the fixed component 8 is not assembled with the flexible surface 9, the plurality of supporting rods 91 draw closer to each other in pace with the folding of the flexible surface 9, so that the hanging decorative component 1 forms an umbrella shape, and the flexible surface 9 becomes an umbrella surface, so as to achieve the folding of the hanging decorative component 1 during transportation. In order to achieve a lighting effect of the umbrella, one of the first light strings 21 is partially distributed along a periphery of the flexible surface 9, and each of the remaining first light strings 21 is partially distributed along one of the supporting rods 91. Specifically, the first light strings 21 can be fixed on a flexible component by gluing, and the flexible component can be made of cloth, rubber, etc.

In one embodiment, the fixed component 8 includes a base 82 and a front board 81 detachably connected to the base 82. A hook 15 is provided on the front board 81. A second via hole 92 is provided on the flexible surface 9. The base 82 is provided with a plurality of position limiting slots 83 for limiting positions of the supporting rods 91. When the fixed component 8 is assembled to the flexible surface 9, the base 82 is positioned on an inner side of the flexible surface 9, and the front board 81 is positioned on an outer side of the flexible surface 9. The base 82 or the front board 81 at least partially passes through the second via hole 92. That is, the fixed component 8 can be clamped on the flexible surface 9. The plurality of supporting rods 91 are each placed in one of the position limiting slots 83. By fixing the supporting rods 91, the flexible surface 9 is propped apart. When the front board 81 is separated from the base 82, the plurality of supporting rods 91 can be folded and stacked together.

In one embodiment, a screw hole is defined in the front board 81, and a screw rod 84 is provided on the base 82. When the front board 81 is assembled with the base 82, the screw rod 84 passes through the second via hole 92 and then is tightened into the screw hole, thereby achieving a detachable connection between the front board 81 and the base 82.

In the above embodiments, the first light strings 21 and the second light strings 22 both include two conductive wires and light emitting units 23. Two pins of the light emitting units 23 are welded to the two conductive wires and wrapped in an insulation layer. By gluing at positions of the light emitting units 23, connections where the light emitting units 23 are connected to the conductive wires are wrapped to achieve waterproof effect.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A decorative lamp comprising:

a hanging decorative component for hanging the decorative lamp in the air;

a connecting component connected to the hanging decorative component, the connecting component being a flexible component;

a decorative component connected to the connecting component; and at least one of the hanging decorative component, the connecting component, and the decorative component being provided with light emitting units for emitting light, wherein the connecting component is a light string component, and the hanging decorative component is foldable;

the light string component comprises a plurality of first light strings, and at least one part of the first light strings extends to the hanging decorative component, and wherein annular components are provided between the decorative component and the first light strings; the decorative component comprises a middle body, supporting arms connected to the middle body, and tape bodies connected to the supporting arms: two ends of the tape bodies are detachably connected; when the tape bodies are sleeved on the annular components, and the two ends of the tape bodies are connected.

2. The decorative lamp of claim 1, wherein the decorative component and the connecting component are arranged detachably.

3. The decorative lamp of claim 1, wherein the tape bodies are hook and loop fasteners, one surface of the tape bodies is a hook surface and an opposite surface of the tape bodies is a loop surface; when the hook and loop fastener tape bodies are sleeved on the annular components, at least one part of the loop surface is fitted with the hook surface.

4. The decorative lamp of claim 1, further comprising a control box, wherein the control box is internally equipped with a circuit board and batteries, the circuit board is electrically connected to the first light strings, and the batteries are electrically connected to the circuit board.

5. The decorative lamp of claim 3, wherein the annular components are hollow, the annular components comprise a first front housing and a first bottom housing, and the first bottom housing is connected to the first front housing to form an annular accommodating cavity:

the annular components are equipped with a wire inlet hole and a wire outlet hole, and both the wire inlet hole and the wire outlet hole are in communication with the annular accommodating cavity;

the light string component further comprises second light strings, at least one part of the first light strings is electrically connected to one of the second light strings at one end away from the hanging decorative component, the circuit board is electrically connected to the second light strings, a connection where the first light strings are connected to the second light strings is positioned in the annular accommodating cavity, the first light strings pass through the wire inlet hole, and the second light strings pass through the wire outlet hole;

a plurality of first position limiting columns are arranged inside the annular accommodating cavity, the first position limiting columns are provided with first position limiting openings, the first light strings or the second light strings are placed inside the first position limiting openings.

6. The decorative lamp of claim 5, wherein a total number of the annular components, a total number of the second light strings, and a total number of the supporting arms are all two; each of the supporting arms is configured corresponding to one of the annular components, and each of the second light strings is configured corresponding to one of the annular components:

the control box is provided with a wire electrically connected to the circuit board, the wire is provided with an electrical connector at one end away from the control box, the electrical connector comprises a first connection terminal and a second connection terminal, the first connection terminal is electrically connected to the wire, and the second connection terminal is used in conjunction with the first connection terminal; the second light strings are electrically connected to the second connection terminal, when the second connection terminal is used in conjunction with the first connection terminal, the second connection terminal is electrically connected to the first connection terminal.

7. The decorative lamp of claim 6, wherein the control box comprises a second bottom housing and a second front housing, the second front housing is connected to the second bottom housing to form a first accommodating cavity, one side of the second front housing is rotatably connected to the second bottom housing, and an opposite side of the second front housing is detachably connected to the second bottom housing:

the second bottom housing is provided with a baffle board, and the first accommodating cavity is separated by the baffle board to form a first installation cavity and a second installation cavity, the circuit board is arranged in the first installation cavity, and the batteries are arranged in the second installation cavity;

the first installation cavity is equipped with a cover board above the circuit board, the circuit board is equipped with a function button, the cover board is equipped with an avoidance hole at a position corresponding to the function button, the second front housing is equipped with a first via hole at a position corresponding to the function button, and the first via hole is equipped with a soft rubber element.

8. The decorative lamp of claim 7, wherein the soft rubber element comprises a soft rubber layer and a soft rubber enclosure wall extending downwards from the soft rubber layer, a pressing element of the function button is placed inside the soft rubber enclosure wall, a bottom of the soft rubber enclosure wall abuts against the cover board, a clamping slot is provided on an outer side wall of the soft rubber layer, and a side wall of the first via hole is placed inside the clamping slot.

9. The decorative lamp of claim 6, wherein the decorative component is provided with a placement slot for placing the control box;

the decorative component is detachably equipped with a backpack, and the placement slot is defined in the backpack.

10. The decorative lamp of claim 9, wherein the backpack is equipped with two shoulder straps, and the two shoulder straps are arranged on the supporting arms.

11. The decorative lamp of claim 6, wherein the hanging decorative component is in a flat shape;

the hanging decorative component comprises a hollow semicircular arc rod, a wave-shaped rod, an arc-shaped rod, and a plurality of connecting rods;

two ends of the wave-shaped rod are respectively connected to and in communication with two ends of the semicircular arc rod, both ends of the arc-shaped rod are connected to and in communication with the semicircular arc rod, the plurality of connecting rods are arranged at intervals, two ends of the connecting rods are respectively connected to and in communication with the arc-shaped rod and the wave-shaped rod;

one of the first light strings is partially placed inside the semicircular arc rod and distributed along a lengthwise direction of the semicircular arc rod, one of the first light strings is partially placed inside the wave-shaped rod and distributed along a lengthwise direction of the wave-shaped rod, and one of the first light strings penetrates through a bottom of one of the connecting rods, passes through the arc-shaped rod and then exits from a bottom of another connecting rod;

one end of the plurality of first light strings positioned on a left side of a central axis of the hanging decorative component is electrically connected to one of the second light strings, and one end of the plurality of first light strings positioned on a right side of the central axis of the hanging decorative component is electrically connected to one of the second light strings.

12. The decorative lamp of claim 11, wherein a total number of the connecting rods is four, and two of the first light strings are partially placed inside the middle two connecting rods respectively.

13. The decorative lamp of claim 11, wherein the hanging decorative component comprises a first housing body and a second housing body, and the second housing body is detachably connected to the first housing:

the hanging decorative component further comprises connecting housing bodies, two ends of the connecting housing bodies are detachably connected to the first housing body and the second housing body respectively, and a hook is provided on one of the connecting housing bodies.

14. The decorative lamp of claim 13, wherein the first housing body is provided with a first fixing block on one side close to the connecting housing bodies, and the second housing body is provided with a second fixing block on one side close to the connecting housing bodies; the connecting housing bodies are provided with a first fixing position and a second fixing position at positions respectively corresponding to the first fixing block and the second fixing block, the first fixing block is placed in the first fixing position when the connecting housing bodies are connected to the first housing body, and the second fixing block is placed in the second fixing position when the connecting housing bodies are connected to the second housing body;

the first housing body, the connecting housing bodies, and the second housing body all comprise a third front housing and a third bottom housing, the third bottom housing is connected to the third front housing to form a second accommodating cavity, the third bottom housing or the third front housing is provided with second position limiting columns on one side near the second accommodating cavity, and the second position limiting columns are provided with second position limiting openings for limiting positions of the first light strings;

a total number of the connecting housing bodies is three, and the connecting housing bodies are respectively positioned in a middle of the semicircular arc rod, the wave-shaped rod, and the arc-shaped rod.

15. The decorative lamp of claim 14, wherein a counterbore is provided on the third front housing, a stud is provided on the third bottom housing, and the third front housing is locked onto the stud after a screw passes through the counterbore.

16. The decorative lamp of claim 6, wherein the hanging decorative component comprises a flexible surface, a plurality of supporting rods arranged on the flexible surface, and a fixed component detachably connected to the flexible surface; when the fixed component is connected to the flexible surface, the supporting rods are fixed, so that the flexible surface is unfold; when the fixed component is not assembled with the flexible surface, the plurality of supporting rods draw closer to each other in pace with the folding of the flexible surface:

one of the first light strings is partially distributed along a periphery of the flexible surface, and each of the remaining first light strings is partially distributed along one of the supporting rods.

17. The decorative lamp of claim 16, wherein the fixed component comprises a base and a front board detachably connected to the base, a hook is provided on the front board, a second via hole is provided on the flexible surface, and the base is provided with a plurality of position limiting slots for limiting positions of the supporting rods:

when the fixed component is assembled to the flexible surface, the plurality of supporting rods are each placed in one of the position limiting slots, the base is positioned on an inner side of the flexible surface, and the front board is positioned on an outer side of the flexible surface.

18. The decorative lamp of claim 17, wherein a screw hole is defined in the front board, and a screw rod is provided on the base; when the front board is assembled with the base, the screw rod passes through the second via hole and then is tightened into the screw hole.

* * * * *